Sept. 5, 1967 M. ORAIN 3,339,315
GRINDING MACHINE
Filed Jan. 29, 1965 3 Sheets-Sheet 1
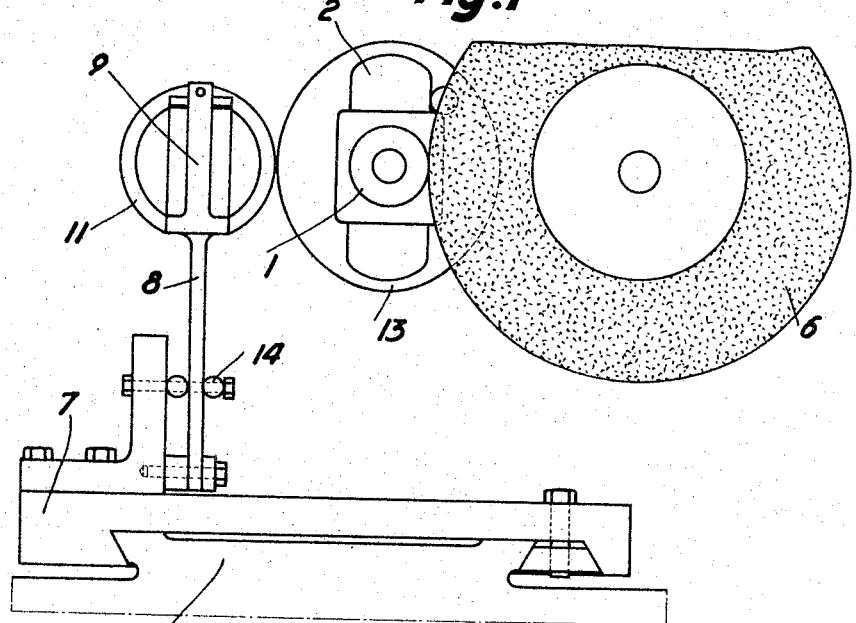
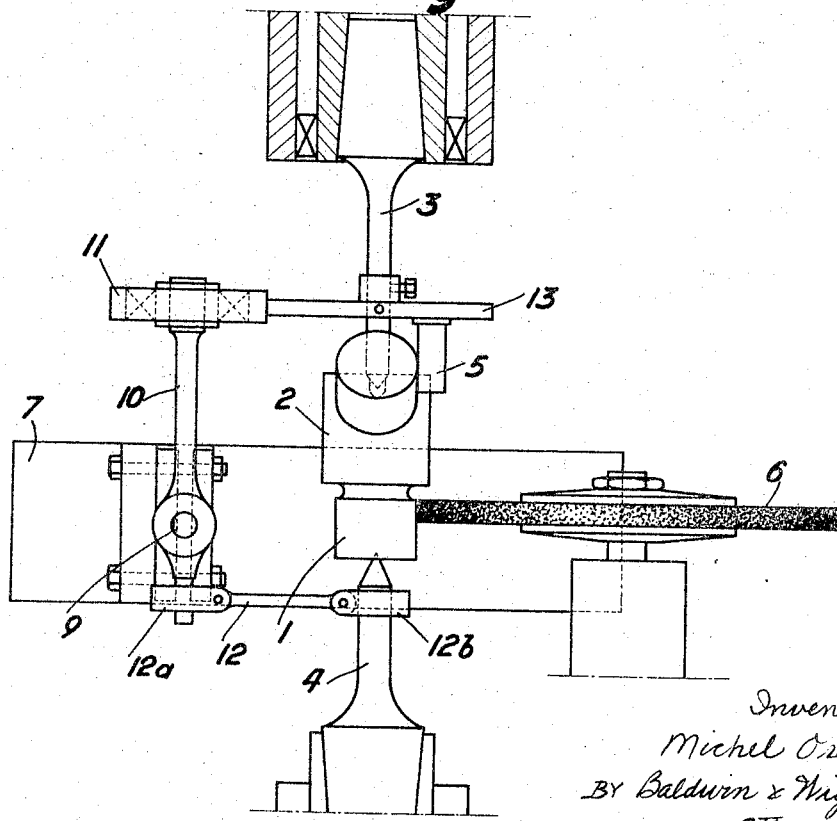
Inventor:
Michel Orain
By Baldwin & Wight
Attorneys Sept. 5, 1967  M. ORAIN  3,339,315
GRINDING MACHINE
Filed Jan. 29, 1965  3 Sheets-Sheet 2

Inventor:
Michel Orain
By Baldwin & Wight
Attorneys

Inventor:
Michel Orain
BY Baldwin & Wight
Attorneys

United States Patent Office 3,339,315
Patented Sept. 5, 1967

3,339,315
GRINDING MACHINE
Michel Orain, Courbevoie, France, assignor to Societe Glaenzer Spicer Societe Anonyme, Poissy, Seine-et-Oise, France, a corporation of France
Filed Jan. 29, 1965, Ser. No. 429,066
Claims priority, application France, Feb. 4, 1964, 962,619
14 Claims. (Cl. 51—101)

The present invention relates to the highly precise grinding of workpieces having a surface which slightly differs from a surface of revolution or a plane surface, according to a predetermined shape which may either be fixed or vary along the workpiece.

Machines for grinding workpieces which have a shape which slightly differs from a plane surface or a surface of revolution, such as cams, pistons of internal combustion engines, pistons of hydraulic distributors, and the like, are already known. In such machines the wheel-head or tool holder, or the headstocks or centers holding the workpiece are controlled by a hydraulic or electromechanical servo-system. This servo-system alters the distance between the machined workpiece and the cutting tool or grinder and is controlled in its turn by a device which copies a pattern and which turns or moves in synchronism with the movement of the workpiece.

The known reproducing devices are complex and therefore costly to purchase and maintain. They are fairly slow, as the workpiece necessarily moves slowly, especially when very precise reproduction is required. Even at slow speeds known machines only give limited precision due to the friction, inertia, elastic strains and vibrations resulting from their complicated lay-out.

The present invention aims at overcoming the above mentioned difficulties which exist in known grinding machines.

A device according to the invention comprises at least one pattern or templet of suitable shape with which cooperate reading means such as non-sliding rollers or cam followers, said reading means being coupled with flexible means having an adjustable resiliency producing a force proportional to the movement of said reading means along said pattern or templet, which force is in turn transmitted to at least one flexible beam supporting the workpiece. Said workpiece may thus be moved with respect of the grinding tool proportionally to the indications given by said reading means.

The flexible means, such as a spring for example, transmits a force, which is transformed into a modification of the distance between the workpiece and the grinding tool, and strictly in proportion relative to the displacement of the rollers or followers.

Given a suitable choice of ratio between the force of the flexible means used in conjunction with the reading means and the flexible beam which support the workpiece, it is possible to vary the ratio of reproduction correspondingly.

As a general rule it is preferable to select flexible means of appreciably greater force than that of the flexible supports for the workpiece. For example, the flexible means may be a hundred times more elastic or flexible than the bearing beam for the workpiece. This feature of the invention allows great precision to be obtained in the workpiece in spite of defects in the movement of the roller or in the cam contour, since the reproducing device only moves a short distance and is thus not subject to friction.

According to a preferable embodiment of the invention a roller is supported by one of the ends of an arm rotatably mounted on a shaft secured to a flexible spring runs without slipping on a master cam which is fast with the workpiece and the movement between the resilient supports of the workpiece and the tool holder thus ensures that the workpiece is given the desired profile. If a workpiece with a varying profile is desired the generatrices of the roller are given a suitable shape.

For the grinding of an approximately flat workpiece, for example for grinding a disk according to the invention, the workpiece can be fixed to a table, which is moved in rotation by a headstock through a flexible shaft, and carries a simple or multiple cam cooperating with rollers mounted on flexible supports fixedly connected to the headstock. The tool, i.e. the grinder, remains stationary in relation to the workpiece, which is ground according to a predetermined pattern corresponding to the shape of the said cam or cams. It is possible to proceed in the same manner to carry out additional shaping of the workpiece, by using at least one roller having generatrices of varying profile and by causing the flexible support of said roller to follow the movement of the tool.

Various embodiments of the invention are described hereinafter with reference to the appended drawings in which:

FIG. 1 is a side elevational view of a first embodiment of a device according to the invention mounted on a conventional grinding machine in which the tool acts upon the outer surface of the workpiece.

FIG. 2 is a part-sectional, elevational view of the device of FIG. 1, as seen from above.

Figure 3:
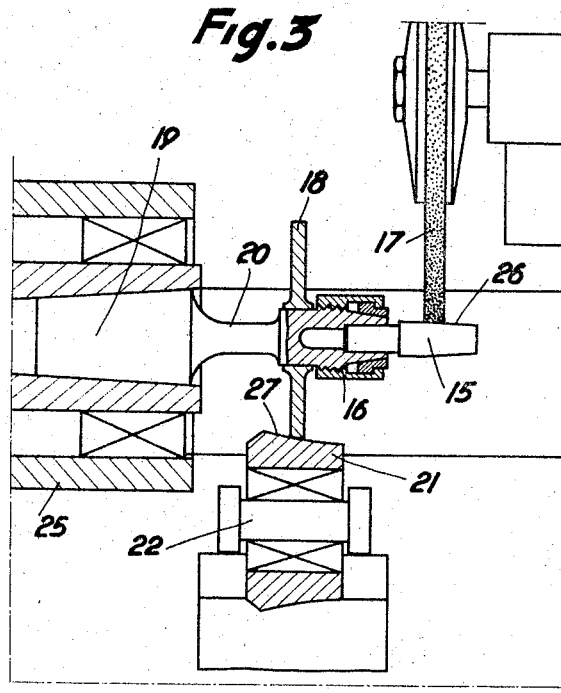
FIG. 3 is a view, similar to FIG. 2, of another embodiment of the invention.

The device shown in FIGURES 1 and 2 is intended for grinding of a trunnion 1 to obtain an oval contour thereof. Member 2 incorporating said trunnion is held between a revolving center 3 and a dead center 4, which are both resilient. Said member 2 is rotated by a carrier 5 secured on revolving center 3. A grinder 6 of known type operates in the same conditions as for a cylindrical grinding. A base 7 secured to table 7a of the grinding machine carries a vertical, resilient blade 8 extending at its upper end in a trunnion 9 on which is pivotally mounted a two-armed lever 10. At the end of one arm of said lever 10 is rotatably mounted a roller 11 while the other arm of said lever is connected by means of a rod-end strap 12a to one end of a connecting rod 12 the other end of which is connected by means of a rod-end strap 12b to dead center 4. Roller 11 is adapted to revolve without slipping on a cam 13 the peripheral surface of which forms a pattern of the contour to be reproduced on trunnion 1.

Variations in length of the vector radius, of cam 13, i.e. the distance between the center of said cam and the point of contact of the peripheral surface thereof with roller results in a variation of the distance between the respective centers of the roller and the cam. According to the invention resilent blade 8 yields in proportion to said variation and the resilient reaction thereof is distributed by arm 10 between the two flexible centers 3 and 4. The distance between the axis of trunnion 1 being machined and the axis of grinder 6, therefore varies synchronously with the rotation of said trunnion, whereby the peripheral surface of trunnion 1 is given a shape which is homothetically an exact reproduction of that of cam 13, rotated by an angle of 90°.

The flexibility of centers 3 and 4 and the respective lengths of the arms of lever 10 are determined, in the example shown, to obtain a constant shape along the whole length of trunnion 1. The variation of flexibility of resilient blade 8 which may be obtained, for example, by vertically moving a clamp 14, increases or reduces the proportion between ratio of the greater and smaller radii in cam 13 and of that in trunnion 1. The relation between the flexibility of resilient blade 8 and that of centers 3 and 4 conditions the reproduction ratio.

Figure 4:
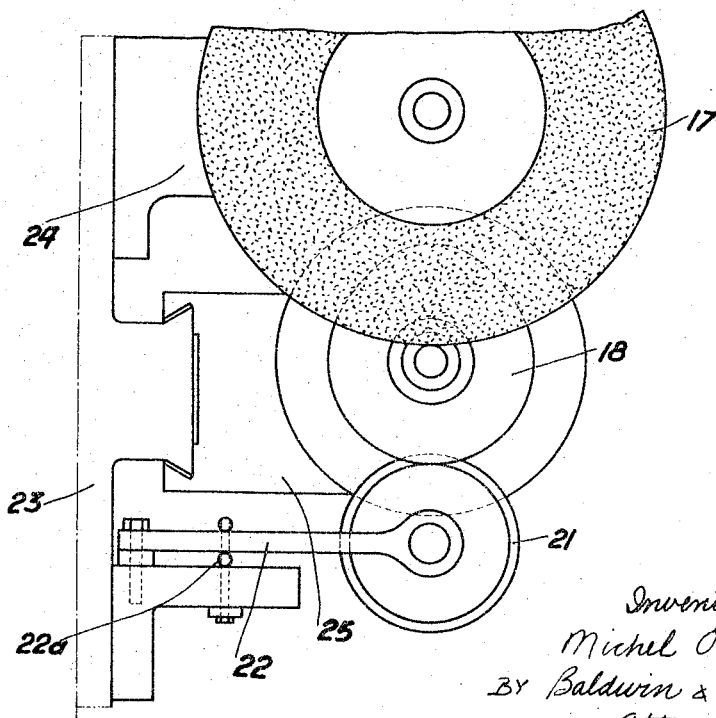
FIG. 4 is a side elevational view of the device of FIG. 3.

FIGURES 3 and 4 show a modification of the device according to the invention used for grinding a workpiece by means of a grinder operating on the outer surface of the workpiece, said workpiece being held in position by means of a single resilient support. Referring to FIGURES 3 and 4, the workpiece 15 to be machined is gripped in a collet 16 and bitten by a grinder 17. A cam 18 is secured to collet 16 which is supported by a conical support 19 which has a resilient part 20. Said cam 18 rolls on a roller 21 rotatably mounted on a resilient support 22 secured to the same bed 23 as the grinder pillar 24. The flexibility of support 22 may be varied by moving clamp 22a along said support. The workpiece holder 25 is movable along a path which is parallel with the axis of rotation of workpiece 15 for shifting the point of contact of grinder 17 with the generatrix 26 of workpiece 15. In this embodiment of the invention the shape obtained for workpiece 15 may vary along said generatrix 26. The peripheral surface of workpiece 15 is given a local shape by cam 18, and the variation of said shape along generatrix 26 results from the profile of generatrix 27 of roller 21. The variation of the shape of the workpiece could also be obtained by giving the generatrices of the cam-surface of a convenient profile, such as cam 18, that of roller 21, said roller then being reduced in thickness. Such a device makes it possible to obtain surfaces having a shape which varies along the generatrices, in any manner required.

Figure 5:
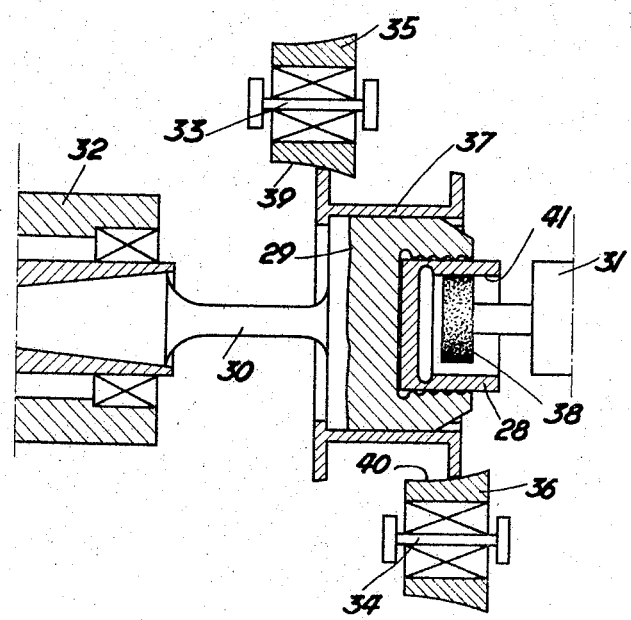
FIG. 5 is a horizontal sectional view of a device according to the invention mounted on a conventional grinding machine in which the tool operates inside the workpiece.

The invention is not limited to devices in which the grinding tool operates on the outer surface of the workpiece. FIGURE 5 shows an example of a device adapted for grinding the inner surface of a bearing 28. Said bearing is mounted in a chuck 29 carried by a flexible shaft 30. The grinding wheel-head 31 is rigidly connected, e.g. by means of a sliding table (not shown) to the fixed ends of two resilient supports 33 and 34, similar to support 22 of FIGURES 3 and 4, carrying rollers 35 and 36 which roll on the cam surfaces of a double cam 37 which rotates with chuck 29. Said rollers thus follow the movement of the grinding wheel 38, the successive points of generatrices 39 and 40, of appropriate shape successively contacting the cam surfaces of cam 37. Said cam surfaces have a shape corresponding to the basic profile desired for the bore of the bearing, e.g. a slightly oval shape. The shape of generatrices 39 and 40 of the two rollers 35 and 36 conditions the variation in the diameter of the bore of the bearing along generatrix 41 thereof.

Figure 6:
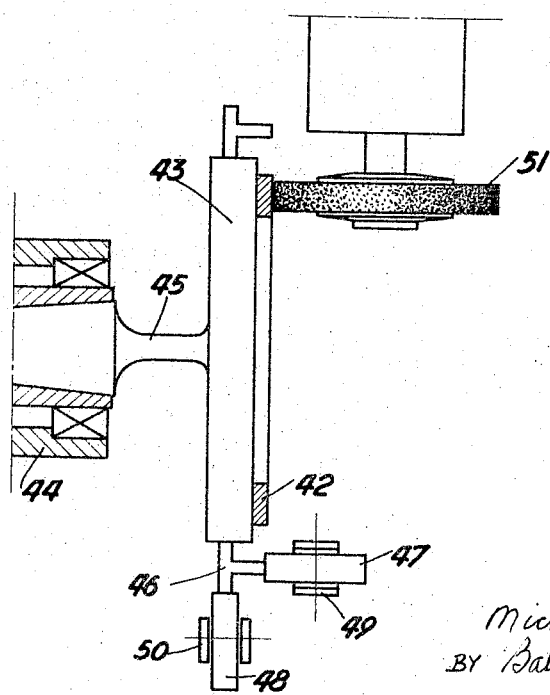
FIG. 6 is a part-sectional, elevational view, as seen from above, of still another embodiment of the device according to the invention for the grinding of an approximately flat workpiece.

FIGURE 6 shows another embodiment of the invention, adapted for grinding a flat disc. A disc 42 which is to be ground is mounted on a table 43 by clamping or magnetic attraction. Table 43 is carried by a headstock 44 through a flexible spindle 45 and a cam 46. Two rollers 47 and 48 cooperate respectively with said cam surfaces, said rollers being respectively mounted on resilient supports 49 and 50 similar to support 22 of FIGURES 3 and 4, and said supports are carried by a table (not shown) similar to table 23 which carries headstock 44. In this manner disc 42 can be given variable thicknesses according to a predetermined rule corresponding to the operational requirements of the workpiece, owing to the relative movement obtained between table 43 and grinding wheel 51.

The assembly shown diagrammatically in FIG. 6 can be used either for varying the thickness of disk 42 in a radial direction, said disk having a circular outer shape, or for combining such a variation in thickness in a radial direction with an outer shaping of said disk, differing from the circular shape. For such a purpose, it is only necessary to replace roller 47 by another roller the generatrices of which has a shape similar to that of the generatrices of rollers 21 of FIG. 3 or 35, 36 of FIG. 5, and to cause the resilient support 49 of said roller 47 to move with the grinder 51 in a direction parallel to its axis of rotation.

As shown by the above described examples the invention has numerous advantages over previously known devices, allowing workpieces to be machined or ground when the surface of the said workpieces is not very different from a plane surface or a surface of revolution.

It should be noted that the invention uses no servo-system, thus avoiding all risk of breakdowns occurring after a certain time, and in consequence ensures the exact and faithful reproduction of a given pattern whatever the number of workpieces manufactured.

Owing to the simplicity of the device according to the invention it is inexpensive to buy and it can easily be mounted on conventional machine-tools, such as grinders, without any modification of said machine.

It has also been emphasized that a suitable choice of the ratio of flexibility between the resilient means and the supports of the workpiece allow the reproduction to be correspondingly modified. For example, if the reproduction is carried out with a reduction ratio of the order of 1/100 for a given precision of machining the workpiece, the master cams of the invention would need to be 100 times less precise than is the case with cams used on known devices.

Workpieces can be manufactured according to the invention with the precision desired. In the case of grinding it is a great advantage of the invention that the workpiece can turn at the speed normally used when pieces are manufactured, whereas in known copying devices the workpiece must rotate slowly.

The invention is not limited to the above-mentioned examples which are merely illustrative. Particularly, other known reading means may be used, such as feelers coupled to a suitable mechanical or electromechanical amplifying device. The number of said reading means, rollers or others, is not limited, but according to the invention they should be associated with resilient means capable of reacting to the movements of the said rollers. Any types and all forms of resilient means may be used, as well as various means of adjustment which allow the elastic force to be varied. Anyone skilled in the art can find other means of carrying out the flexible or resilient mountings of the workpiece without departing from the appended claims.

What I claim is:

1. A device for machining a surface on a workpiece according to a predetermined shape by means of a tool, consisting of a master pattern reproducing the desired shape of the said surface; reading means which move in conjunction with the said pattern; resilient means of variable resiliency, said resilient means being connected to said reading means and producing a resilient force proportional to the value of displacement of said reading means on said master pattern; flexible means for supporting said master pattern, said resilient means being in operative contact with said flexible supporting means so that said surface is subject to the action of said resilient force and moves in relation to the said tool proportionally to the value of said force.

2. A device as claimed in claim 1, in which said reading means consist of a roller which rolls on said master pattern without slipping.

3. A device as claimed in claim 1 in which the said master pattern is a cam having a plurality of cam surfaces and said reading means consist of a plurality of rollers which roll on the said cam surfaces without slipping.

4. A device as claimed in claim 1 for machining workpieces having profiles which vary along generatrices in which said reading means consist of a cylindrical surface of revolution with a curved generatrix, the curve of which corresponds to the profile to be given to said workpiece.

5. A device as claimed in claim 1 for machining workpieces with variable profiles, in which the said master pattern is a cam having a varying profile and the said means of reading consists of a cylinder of revolution with a rectilinear generatrix cooperating with said cam.

6. A device as claimed in claim 1 in which said reading means consists of a feeler cooperating with said master pattern.

7. A device as claimed in claim 1 in which said resilient means consist of a spring blade having one end adjustably held in a fixed support, said blade carrying said reading means.

8. A device as claimed in claim 1 in which the elastic force of said resilient means is considerably greater than the force of said flexible support means.

9. A device as claimed in claim 8 in which the force of said resilient means is about one hundred times greater than the force of said flexible support means.

10. A device for grinding a workpiece having a rounded surface by means of a tool, comprising a flexible movable center adapted to be driven in rotation and a stationary flexible tailstock for holding said workpiece therebetween; a coaxial master cam fixed to said movable center and having a peripheral cam surface; a roller cooperating with said cam surface; a rigid lever having one arm carrying said roller, and another arm connected to said stationary tailstock, said lever being oscillatingly mounted on a pivoting means carried by a spring leaf having a fixed end.

11. A device for grinding a workpiece having a rounded surface by means of a tool, comprising a movable flexible center adapted to be driven in rotation, means for holding said workpiece coaxially onto said movable center, a coaxial master cam fixed to the said movable center and having a peripheral cam surface, a roller cooperating with said cam surface, and a flexible support rotatably carrying said roller.

12. A device for grinding a workpiece having a rounded surface by means of a tool, comprising a movable flexible center adapted to be driven in rotation, means for holding said workpiece coaxially onto said movable center, a coaxial master cam fixed to the said movable center, and having a plurality of cam surfaces, and a plurality of rollers, each of said rollers cooperating with one of said cam surfaces and being carried by a flexible support.

13. A device for grinding an approximately flat workpiece by means of a tool, comprising a flexible movable shaft adapted to be driven in rotation, a supporting table at the end of said shaft, means for holding said workpiece on said table coaxially with said shaft, a master cam fast with said table and having a peripheral cam surface; a roller cooperating with the said cam surface; and a flexible support having one fixed end and an opposite free end, said roller being rotatably mounted on said flexible support.

14. A device for grinding the face of a substantially circular disk by means of a tool facing said face, comprising supporting means for said tool, a flexible movable shaft adapted to be driven in rotation, a supporting table at the end of said shaft, means for holding said disk on said plate, a master cam fast with said plate and having a face which is perpendicular to said movable shaft, and a cam surface formed on said face, a roller cooperating with the said cam surface and consisting of a cylinder having curved generatrices, a flexible support having one end rotatably supporting said roller, and another end rigidly connected with the tool supporting means.

References Cited
UNITED STATES PATENTS

| | | | |
|---|---|---|---|
| 1,326,462 | 12/1919 | Murch | 51—101 |
| 1,672,573 | 6/1928 | Maynard | 51—101 |
| 2,723,500 | 11/1955 | Narel | 51—101 |
| 2,968,896 | 1/1961 | MacFarlane | 51—101 X |
| 3,271,905 | 9/1966 | Balsiger | 51—101 |

ROBERT C. RIORDON, *Primary Examiner.*

D. G. KELLY, *Assistant Examiner.*